UNITED STATES PATENT OFFICE.

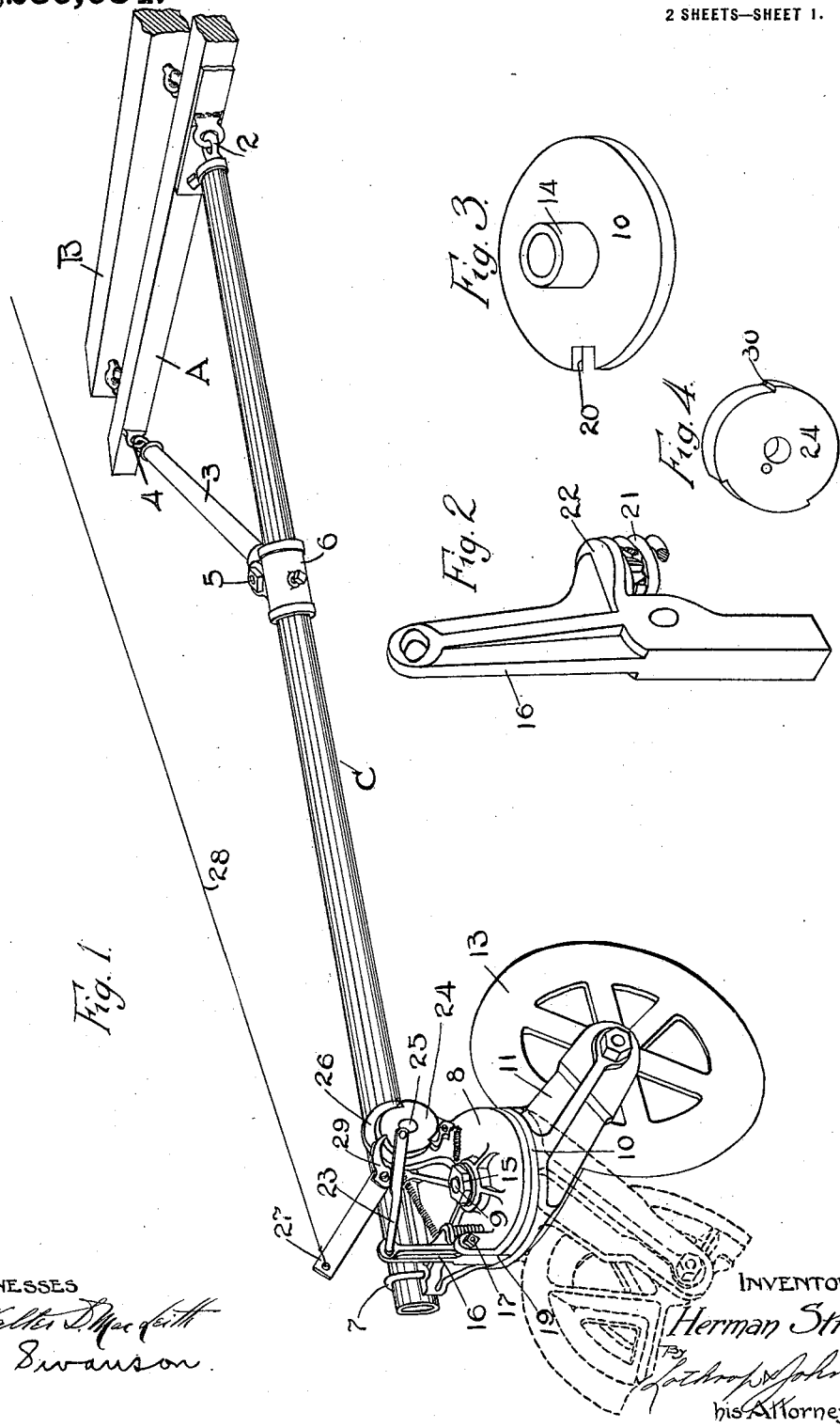
H. STRACK.
PLOW GUIDE.
APPLICATION FILED JAN. 10, 1913.
1,230,084.
Patented June 12, 1917.
2 SHEETS—SHEET 1.

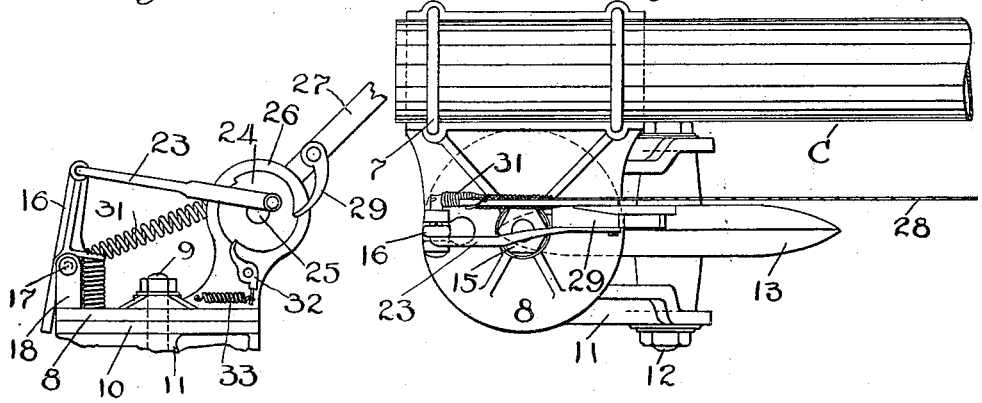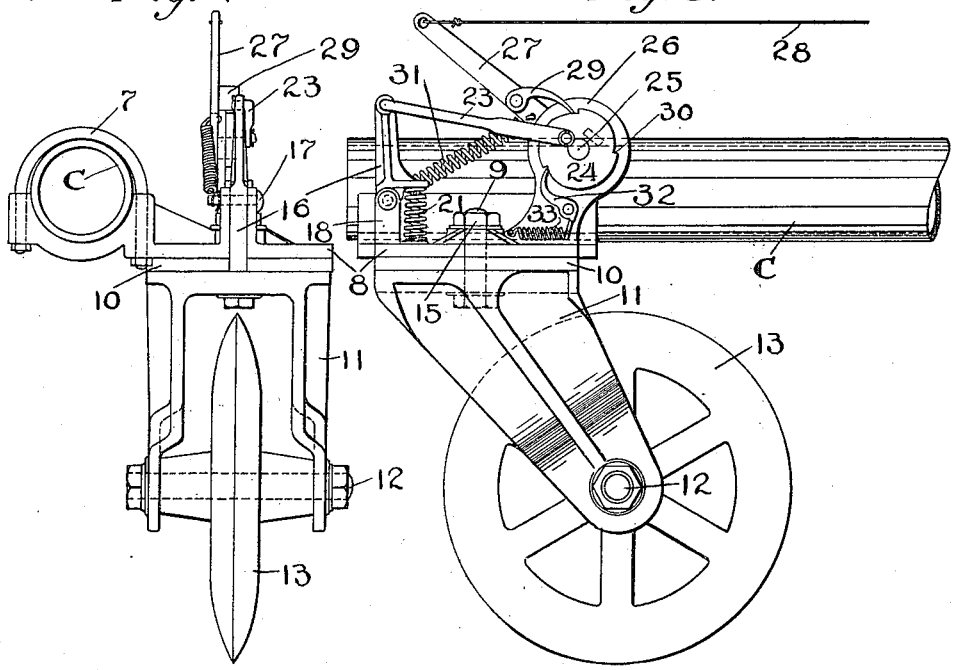

HERMAN STRACK, OF LONG PRAIRIE, MINNESOTA, ASSIGNOR TO HANSMANN MANUFACTURING COMPANY, OF LONG PRAIRIE, MINNESOTA.

PLOW-GUIDE.

1,230,084.  Specification of Letters Patent.  Patented June 12, 1917.

Application filed January 10, 1913. Serial No. 741,222.

*To all whom it may concern:*

Be it known that I, HERMAN STRACK, a citizen of the United States, residing at Long Prairie, in the county of Todd and State of Minnesota, have invented certain new and useful Improvements in Plow-Guides, of which the following is a specification.

My invention relates to improvements in piloting and steering mechanisms designed for use particularly in steering a traction engine where the same is employed for drawing a plurality of plows, etc., the invention being designed, in forward travel, to control the steering mechanism from the furrow last made.

To this end my invention consists particularly in providing a piloting device supported and arranged in connection with the steering mechanism of a tractor as to travel in the furrow last made and thereby control the steering mechanism, and which, when not in use as a steering device in forward travel may be disconnected and allowed to swing freely upon its support, allowing the tractor being guided by its ordinary steering mechanism in turning about and in backing up, etc.

My invention further consists in the features of construction and combination hereinafter described and claimed.

In the accompanying drawings forming part of this specification,

Figure 1 is a perspective view of a steering tongue fitted with my invention;

Fig. 2 is a detail view of a locking dog forming part of my invention;

Fig. 3 is a perspective view of an adjusting plate;

Fig. 4 is a detail view of a ratchet wheel forming part of the invention;

Fig. 5 is a top view of the free end of a tongue and supported pilot attachment;

Fig. 6 is a side elevation of the pilot attachment, partly broken away;

Fig. 7 is an end view of the tongue and supported pilot attachment; and

Fig. 8 is a side elevation of the free end of the tongue and supported pilot attachment.

Referring to the drawings, A represents a cross bar suitably connected with the tractor axle B. C represents a forwardly extending tongue having pivotal support 2 on the cross bar. For the purpose of securing the tongue in laterally adjusted positions I show a bar 3 having pivotal connection 4 at one end with the cross bar A and similar connection 5 at its outer end with a collar 6 adjustably supported upon the tongue. The adjusting mechanism for the tongue forms no part of the present invention and any desired form of adjusting mechanism may be employed.

Supported upon the free end of the tongue as by means of the loops 7 is a laterally offset plate 8. Rotatably supported upon the underside of the plate 8 by means of a bolt 9 is a plate 10. Upon the underside of the plate 10 is supported a caster wheel 13. The plate 10 is formed with an upwardly extending collar 14 surrounding the bolt. A nut 15 screwed upon the upper end of the bolt bears against the top of said collar, whereby to clamp the caster wheel and plate 10 together when said nut is tightened. Sufficient play between the nut and plate 8 may be provided for.

In order to hold the plate 10 locked with reference to the fixed plate 8, I provide the dog 16 having horizontal support 17 in an upwardly extending bracket 18 carried by the plate 8. In locking position the lower end of the dog extends into corresponding slots 19 and 20 in the plates 8 and 10. The dog is held in locked position by a spring 21 interposed between the plate 8 and a lug 22 upon the rear side of the dog. The upper end of the dog is connected by an eccentric rod 23 with a ratchet wheel 24 having pivotal support 25 upon an upwardly extending bracket 26 carried by the plate 8. In order to turn the ratchet wheel to actuate the dog, I provide an arm 27 supported at its lower end upon the ratchet wheel pivot 25 and at its upper end supporting an actuating cable 28 running back to the machine. The arm 27 carries a pawl 29, riding upon the periphery of the ratchet wheel, so as to operatively engage the ratchet wheel teeth 30. As shown, the ratchet wheel is formed with three teeth 30. The arm 27 is normally held in the forwardly extending position shown in Fig. 1 by a spring 31. A safety dog 32 is pivotally supported below the ratchet wheel to engage with the periphery thereof and is held in engaging position by a suitable spring 33.

In operation, the tongue may be set at any desired angle with reference to the axle and the guide wheel adjusted, whereby when said guide wheel runs in the furrow last made the tractor will be caused to travel at the adjusted offset position with reference to the furrows. Where it is desired to turn at the end of the furrow, or to back up the tractor as in coupling the same to the plows, the dog 16 may be pulled out of locking engagement with the disk 10 by a pull upon the cable 28 to allow the guide wheel to revolve freely and completely, unaffected by the locking mechanism. When the cable 28 is pulled upon to release the dog 16 from the disk 10 the parts will be carried into the position shown in Fig. 6. The releasing of the cable 28 will then allow the arm 27 and supported pawl 29 to drop back to normal position. With the parts as shown in Fig. 6 the caster is free to rotate completely and freely. This is of essential importance, as it allows the caster to turn completely around, so that as the machine is being backed the caster will project forwardly as indicated in dotted lines in Fig. 1 and further allows the caster to freely make as many revolutions as may be desired in the different backing and turning movements of the tractor. Experimentation and use has demonstrated that it is necessary for the caster to be completely and freely revolved in order to allow the tractor to be backed up and turned as desired in coupling up to the plows, also allowing it to be turned around at the end of the furrow in the smallest possible compass. When the tractor has been turned around or properly backed and coupled to the plows, as the case may be, the cable is again pulled upon to turn the ratchet and bring the lower edge of the dog 16 into contact with the edge of the disk 10, so that when the caster wheel turns to bring the slots 19 and 20 into alinement, the dog 16 will drop into locking position. Sufficient play between the dog 16 and connecting rod 23 is allowed to permit the dog 16 to rest upon the edge of the disk 10 and thereafter drop into the notches 19 and 20.

I claim as my invention:

1. In a steering mechanism for plows, the combination with the steering axle of a forwardly projecting frame, a plate fixed in horizontal position on said frame, a rotary plate carried by said fixed plate, a caster carried by said rotary plate and adapted to be set at predetermined angles thereto, a dog pivoted on said fixed plate and having a locking engagement with said rotary plate, a rotary element carried by said fixed plate, a connecting rod connecting said dog with said rotary element and arranged to pull the latter out of locking engagement with said rotary plate as said rotary element is actuated, means for rotating said rotary element in step by step order to alternately swing said dog into locking and unlocking position, and means to hold said rotary element in each of its step by step positions.

2. In a steering mechanism for plows, the combination with the steering axle of a traction engine, of a forwardly extending tongue supported by said axle, a horizontal fixed plate carried by the extremity of said tongue, a rotary plate carried by said fixed plate and supporting a pilot wheel, said pilot wheel being adapted to be adjusted at a predetermined angle to said tongue, a dog pivoted on said fixed plate for locking said rotary plate at the above mentioned predetermined angle and pawl and ratchet mechanism for said dog actuated to carry said dog to hold the latter alternately in released or locked position.

In testimony whereof I affix my signature in presence of two witnesses.

HERMAN STRACK.

Witnesses:
W. E. LEE,
PETER J. PETERSON.

Copies of this patent may be obtained for five cents each, by addressing the "Commissioner of Patents, Washington, D. C."